United States Patent [19]
Mattson et al.

[11] Patent Number: 5,983,269
[45] Date of Patent: Nov. 9, 1999

[54] METHOD AND APPARATUS FOR CONFIGURING ROUTING PATHS OF A NETWORK COMMUNICATIVELY INTERCONNECTING A NUMBER OF PROCESSING ELEMENTS

[75] Inventors: H. David Mattson, Kelseyville, Calif.; William J. Watson, Austin, Tex.; David J. Garcia, Los Gatos, Calif.; David P. Sonnier, Austin, Tex.

[73] Assignee: Tandem Computers Incorporated, Cupertino, Calif.

[21] Appl. No.: 08/764,115

[22] Filed: Dec. 9, 1996

[51] Int. Cl.[6] ................................................. G06F 11/00
[52] U.S. Cl. ..................... 709/221; 370/440; 370/455; 709/223; 709/222; 709/226; 709/238
[58] Field of Search .......................... 395/200.5–200.52, 395/200.56, 200.68, 858, 311, 200.1, 200.02, 200.15; 370/440, 455; 209/221

[56] References Cited

U.S. PATENT DOCUMENTS

| | | |
|---|---|---|
| 5,297,262 | 3/1994 | Cox et al. ................................. 395/856 |
| 5,446,915 | 8/1995 | Pierce ....................................... 395/800 |
| 5,521,972 | 5/1996 | Iki .............................................. 379/221 |
| 5,625,780 | 4/1997 | Hsieh et al. .............................. 395/311 |
| 5,740,176 | 4/1998 | Gupta et al. .............................. 370/440 |

*Primary Examiner*—Moustafa M. Meky
*Assistant Examiner*—Hieu C. Le
*Attorney, Agent, or Firm*—Townsend and Townsend and Crew LLP

[57] ABSTRACT

A multiple processing system, comprises at least a pair of processor units communicatively connected to a number of peripheral devices through a network that includes routing devices interconnected to route information in the form of message packets sent between the processor units and peripheral devices. Data describing the topographical interconnections of the system elements is maintained with the system. A service processor accesses the data, determines therefrom the topographical interconnections forming the network, assigns addresses/identifications to the system elements, and configures the router devices to establish the most direct routes between system elements for message packets sent on the network.

7 Claims, 10 Drawing Sheets

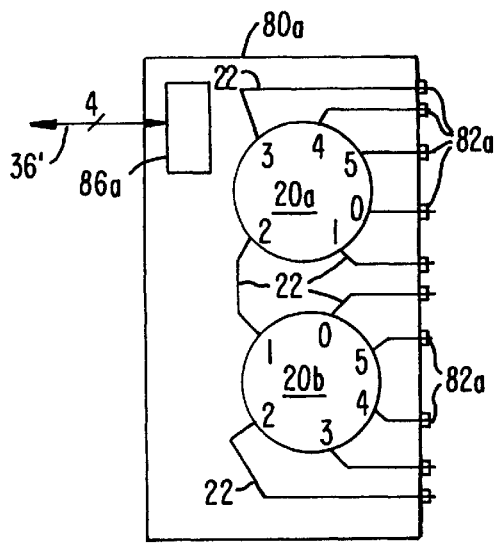
FIG. 3.
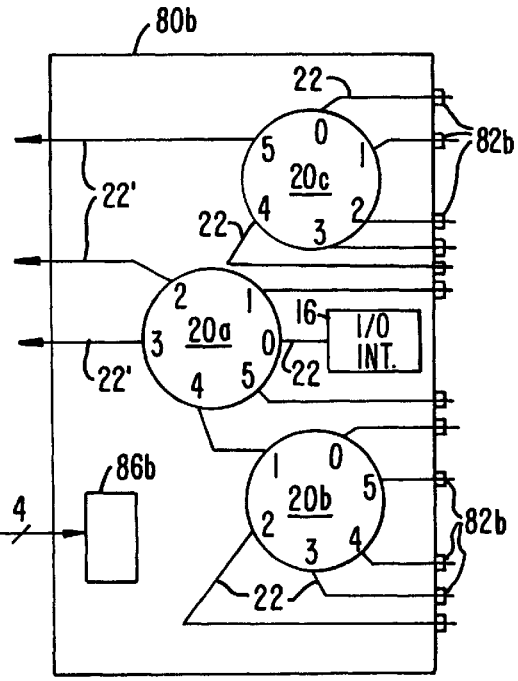
FIG. 4.
FIG. 5.
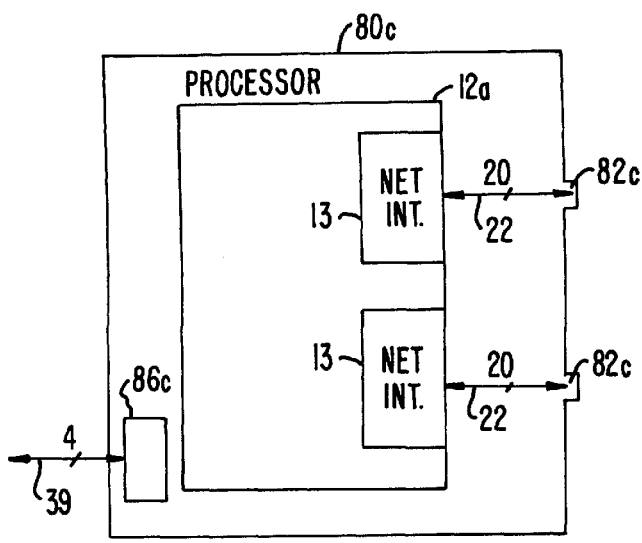
FIG. 6.

METHOD AND APPARATUS FOR CONFIGURING ROUTING PATHS OF A NETWORK COMMUNICATIVELY INTERCONNECTING A NUMBER OF PROCESSING ELEMENTS

BACKGROUND OF THE INVENTION

The present invention relates generally to data processing systems, and particularly to a method, and apparatus for implementing that method, of determining the network configuration of a processing system of the type comprising a number of processing elements communicatively interconnected by a network.

System elements, including one or more processor units, of processing systems often communicate to transfer data and other information by some form of shared medium (e.g., bus). Addresses, or some other means of identification (e.g., dedicated signal lines, etc.) that identify the source and destination of such transfers are provided by variety of techniques such as hard wiring, user manipulated switches, or identification words that are loaded at initialization time when the system is brought on line. Such shared medium topologies usually did not require any type of special configuration process.

Larger processing systems may communicatively interconnect system elements by a local area network (LAN), System Area Network (SAN), or even wide area networks (WANs). These types of communication mediums (hereinafter, generally "interconnective networks") often do need some form of configuration process in order to (1) ensure that information transfers are received by the appropriate destinations, and (2) that the transfer takes, if not the shortest route, then the most expeditious route possible. Such processing systems often employ some form of intermediate device to deliver information from one system element to another. For example, LANs and WANs use routers, bridges, hubs, and like devices to route information—usually in the form of multi-bit packets containing data identifying the destination and usually the source of the packet. Configuration in this context, then, refers to expeditious routing of a packet, based upon the destination identified in the packet, through the intermediate devices; it also refers to appropriate connections (cabling), assignment of identification or addresses to those system elements that send and/or receive information via the interconnecting network, and programming of the intermediate devices.

The topology of such interconnective networks, and its configuration, often is a manual function and, therefore, labor intensive. The topology is determined by the physical connections (cabling) of the individual pieces of the LAN or WAN during assembly. Configuring the LAN/WAN is usually done through network management techniques, utilizing a workstation that operates as a network manager to access certain of the network media devices (routers, bridges, switches, hubs, and the like) to program them to transfer received information onto a path that will reach the destination of that information.

Disclosed in U.S. Pat. No. 5,574,849, entitled "Synchronized Data Transmission Between Elements of a Processing System," is a multiple processing system in which the multiple processors communicate with one another and a variety of peripheral devices through a system area network (SAN) comprising a number of multi-ported router devices. The system, as disclosed, is designed to include a very large number of system elements with multiple levels of routing.

The router devices are constructed to include programmable routing tables that contain routing information used to route information transfers (in the form of message packets containing the identifications of the source and destination of the information) between system elements (e.g., a processor and a peripheral device, or between two processors). In such a system, information sent by one system element for receipt by another can take a number of different routes to reach its destination, and the larger the system, the larger the number of routes. While smaller systems may take little effort to configure (e.g., assign addresses, establish routes by writing the appropriate information to the routing tables of the router devices), larger systems become much more difficult, and even larger systems may tend to pose a difficult task.

Accordingly, there is a need for a technique to configure a system area network of a processing system of this type.

SUMMARY OF THE INVENTION

Broadly, the invention is directed to a method, and apparatus for implementing that method, for determining first the topographical communication paths available to a processing system for transferring information between system elements of the system. Having determined that topology, expeditious routes can then be determined between pairs of the system elements and identifications or addresses assigned each system element capable of sending and/or receiving information.

The invention is herein disclosed as being employed by the processing system described in hereinabove-identified U.S. Pat. No. 5,574,849. According to the present invention, predetermined groups of the system elements of the processing system are accompanied by a storage member accessible by a service processor system. The system elements may include multiple processors, input/output (I/O) devices, router devices, or interconnective elements such as a printed-wire backplane structure. The storage member for each group of storage elements contains information describing the system elements of the group and the network interconnections of each system element within the group. The storage member for the interconnective device contains information that describes the network paths between the groups of system elements that it interconnects. When the processing system is brought on-line (i.e., powered-up), the service processor system will access the stored information from the storage members associated with each group of system elements and the interconnect. With this information, the service processor can determine the network path topology of the system that is available for transferring information/data.

Equipped with this topology information, the service processor system can assign identifications (ID; i.e., addresses) to each of the data transmitting/receiving system elements to identify the source and destination points of message packets. Next, routes can be assigned by writing the routing tables of the router devices with routing information that will ensure that message packets will be sent by the shortest network path between any source and destination system element pair. Service processor system access to the system elements for ID assignment and routing table changes is accomplished via a serial maintenance bus (SMB) that is separate from the system network.

In a further aspect of the invention, two previously configured systems may be connected to form one larger system. However, the one system so formed must be configured as a single system so that a message packet from a system element of one system can find its way to a destination contained in the other system—and by the shortest or at least most expeditious route. This is accomplished by a "link probe" procedure that is called when such a connection is detected.

According to this further aspect of the invention, one of the two systems will detect receipt of a data transmission from the other system at a previously unconnected network port. The detection will be reported as an error to the service processor system. To check the error, the service processor system will use the SMB to access the receiving system element. Noting that the error was caused by receipt of a normally valid communication at a network port known to have been previously unconnected, the service processor or system will form a "Link Probe" message packet that contains configuration information of the detecting system. The service processor system will then cause that Link Probe message packet to be transmitted from the network port thought to be previously unconnected.

The Link Probe message packet will, in turn, be unrecognized at the receiving system element of the other system, and handled as an error, and forwarded to the service processor system of that system. The corresponding service processor system will, however, recognize the Link Probe for what it is, a communication from a service processor system of another system. The received configuration information contained in the Link Probe message will then be used by the receiving service processor system to further configure its own associated system so that message packets originating in that system bound for the other will find their way correctly. Thereafter, the service processors of the two systems converse using the network paths to exchange information about the network configurations of their respective systems, allowing each to further configure their respective systems to assimilate the other.

The present invention provides a number of advantages not previously available. First is the fact that system configuration, including assignment of source and destination addresses for network messaging is automatic, and not subject to the more labor-intensive configurations of prior configuration techniques, using as it does the personal involvement of a technician or other worker. This, in turn, reduces the possibility of human error occurring.

These and other advantages and features of the present invention will become apparent to those skilled in this art upon a reading of the following description of the invention which should be taken in conjunction with the accompanying drawings.

BRIEF DESCRIPTION OF THE DRAWINGS

FIG. 3 shows the structure used for message packets conveyed by the system area network shown in FIG. 1;

FIGS. 4, 5, and 6 each illustrate representative system element groups (e.g.,such as may be grouped for being carried by a circuit board, or an other replaceable unit), showing also the storage members associated with each group;

DESCRIPTION OF THE PREFERRED EMBODIMENT

The present invention is preferably used in a multiple processing system, as mentioned above that is the subject of U.S. Pat. No. 5,574,489. Although aspects of that application are described herein to the extent believed necessary for an understanding of the present invention, further details may be had by resort to said application, and to the extent necessary therefore that application is incorporated herein by reference.

Figure 1:
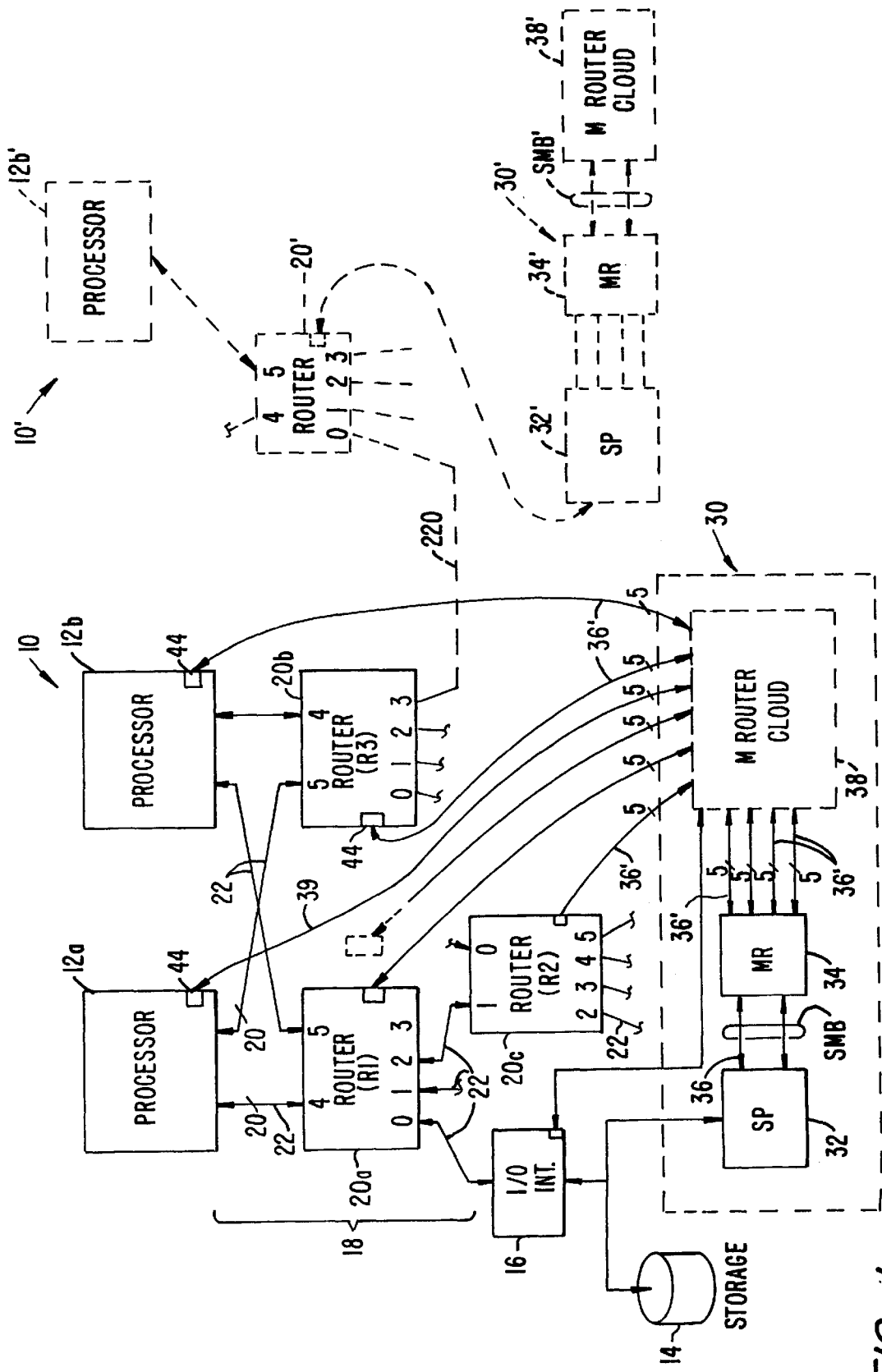
FIG. 1 is an simplified block diagram illustration of a multiple processing system with which the invention may be used, showing the system employing a system wide network that includes router devices to communicate information between the system elements of the system, as well as showing the service processor system.

Turning now to the figures, and for the moment specifically FIG. 1, there is illustrated a processing system designated generally with the reference numeral 10. FIG. 1 is also used to illustrate a system, shown in phantom and identified with the reference numeral 10', being connected to the system 10. That aspect of the invention is discussed further below. For the moment, reference will only be made to the system 10. As FIG. 1 illustrates, the system 10 includes processors 12 (12a, 12b) connected to a number of peripheral units (here represented by storage element 14 and I/O interface element 16) via a system area network (SAN) 18. The SAN 18 includes a number of intermediate elements, router devices 20 (20a, 20b, 20c) and interconnecting network links 22 to route information to and from the processors 12 and other elements of the system 10 (e.g., the I/O interface 16). Also connected to the I/O interface element, in addition to the storage unit 14 (and other peripheral devices not shown) is a maintenance processing system (MPS) 30, comprising a service processor (SP) 32 that is connected to a top level maintenance router (Mrouter) 34 by a system maintenance bus (SMB) 36. The top level Mrouter 34 fans out to communicate the SMB 36 as a number of 5-bit serial buses 36' to a plurality of lower level Mrouters generally represented in FIG. 1 as an Mrouter cloud 38. The Mrouter cloud 38, in turn, communicates the 5-bit serial buses 36' to each member of the system 10, including the processors 12, I/O interface 16, routers 20, and as will be discussed further below, a backplane structure that provides much of the interconnective linking for the SAN 18.

The SMB 36, connecting the SP 32 to the first level Mrouter 34, comprises two separate 4-bit sub-buses: one carrying signals that conform to IEEE Standard 1149.1 (based upon IEEE 1149.1-1990, May 21, 1990, SH 13144, Institute of Electrical and Electronic Engineers, 345 East 47th Street, New York, N.Y. 10017); the other carrying signals that conform to the Serial Peripheral Interface (SPI) protocol used by the MC 68360 quad integrated communications controller manufactured by Motorola, Inc. and described in the user's manual for the MC 68360. In fact, the SP 32 is implemented by using a Motorola MC 68360 quad integrated communications controller, which has separate interface connections for the IEEE 1149.1 sub-bus and the SPI sub-bus. (Obviously, as those skilled in this art will recognize, other microprocessor technologies may be employed.) Use of the SP 32 to drive the SPI and 1149.1 sub-buses of the SMB 36 will be described more fully below. Thus, each of the 4-bit sub buses of the SMB 36 connecting the SP 32 to top-level Mrouter 34 is exclusively dedicated to one or the other of the above-identified protocols. The top-level Mrouter 34, in turn, carries, in multiplexed fashion, one or the other of the two protocol signals to the Mrouter cloud 38 through a number (as preferably implemented, 8; but here, shown as only 4) of 5-bit serial buses 36'. Each 4 lines of the 5-bit bus 36' carry, in multiplexed fashion, either SPI signals or 1149.1 signals. The remaining line carries interrupt signalling.

The Mrouters contained in the Mrouter cloud 38 couple the multiplexed SPI and 1149.1 signals to the various system elements of the processing system 10, i.e., the processors 12, I/O interfaces 16, and routers 20. Each system element is constructed to include an on-line access port (OLAP) 44, containing logic circuitry structured to operate in accordance with the 1149.1 Standard. The OLAP 44 provides the MPS 30 and the SP 32 with access to the constituent components system elements of system 10, allowing various registers, memory, and the like, to be read or written—as will be discussed more fully below.

Information and data is communicated between the processors 12 and peripheral devices of the system 10, such as the storage unit 14, by message packets made up of a number of multi-bit symbols. Each symbol is a one-byte data or command symbol specially encoded as 9-bits, as more fully described in the referenced patent. While the message packets may take various forms, they are generally structured as shown in FIG. 3 to include destination and source fields 52, 54, that respectively identify the destination of the message packet and its originator. Message packets may also include a control field 56, identifying an action to be taken; an address field 58 (identifying where, at the destination, data is, or is to be, located); if data is being transmitted, a data field 60 containing N 9-bit data symbols (where N is preferably no greater than 64); and a cyclic redundancy check field 62.

Message packets are transmitted on the links 22, from system element to system element (e.g., from router device 20a to router device 20c, or processor 12b to router 20b) in bit parallel, symbol serial fashion, with an accompanying transmit clock signal. Thus, each of the links 22 comprises 9 bits of symbol information, and one clock signal. (Actually, each link 22 provides the capability of simultaneous, bidirectional data transmission. Thus, each link will include 10 signal lines for each direction, or 20 signal lines total.)

Figure 2:
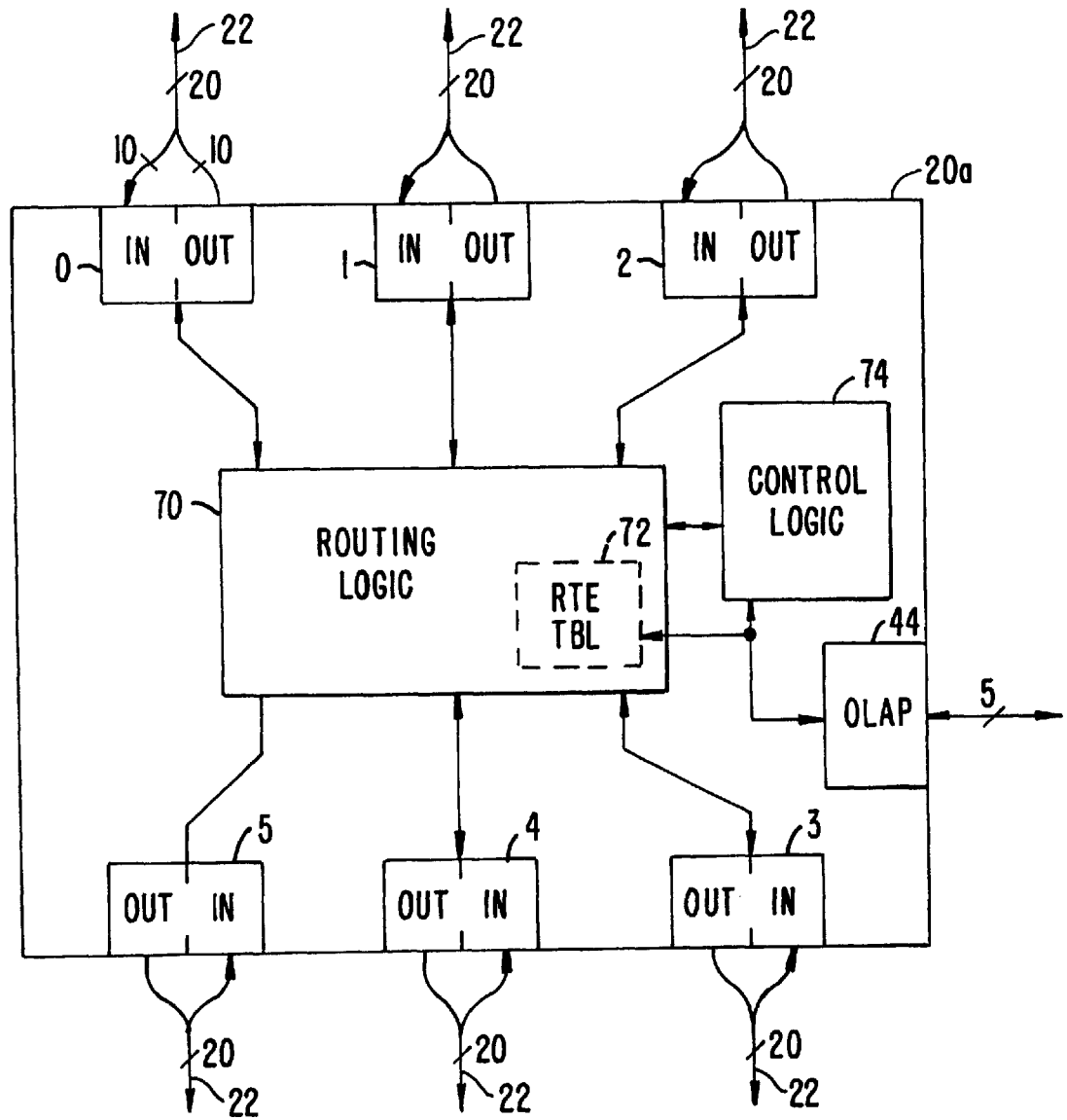
FIG. 2 is a simplified illustration of a router device as used in FIG. 1, showing access thereto by the service processor system.

Turning now to FIG. 2, the router device 20a is illustrated. All router devices 20 are constructed substantially identical to one another, unless otherwise stated, so that a description of router 20a will apply equally to all other routers mentioned herein. As FIG. 2 shows, the router 20a comprises 6 input/output (I/O) ports 0, 1, . . . , 5, each having separate input (IN) interface logic for receiving message packets, and output logic (OUT) logic from which message packets are transmitted. Message packets received at any of the ports 0, 1, . . . , 5 are communicated to routing logic 70 where the destination and source addresses are used to determine to which of the ports 0, 1, . . . , 5 the message packet will be routed for re-transmission. The routing logic 70 includes a routing table 72 that is addressed by at least portions of the destination address of a received message to provide a 3-bit value identifying the output port from which the message packet is to be transmitted. Control logic 74, performs the necessary control functions to maintain synchronous operation of the router $20_a$.

As FIG. 2 also shows, and as explained above, the router device 20a includes an OLAP 44 that is also connected to the control logic 74, and to the routing table 72. The OLAP 44 provides the SP 32, through the Mrouters 34, 36, with write access to the routing table 72 for reasons that will be explained below.

Figure 7:
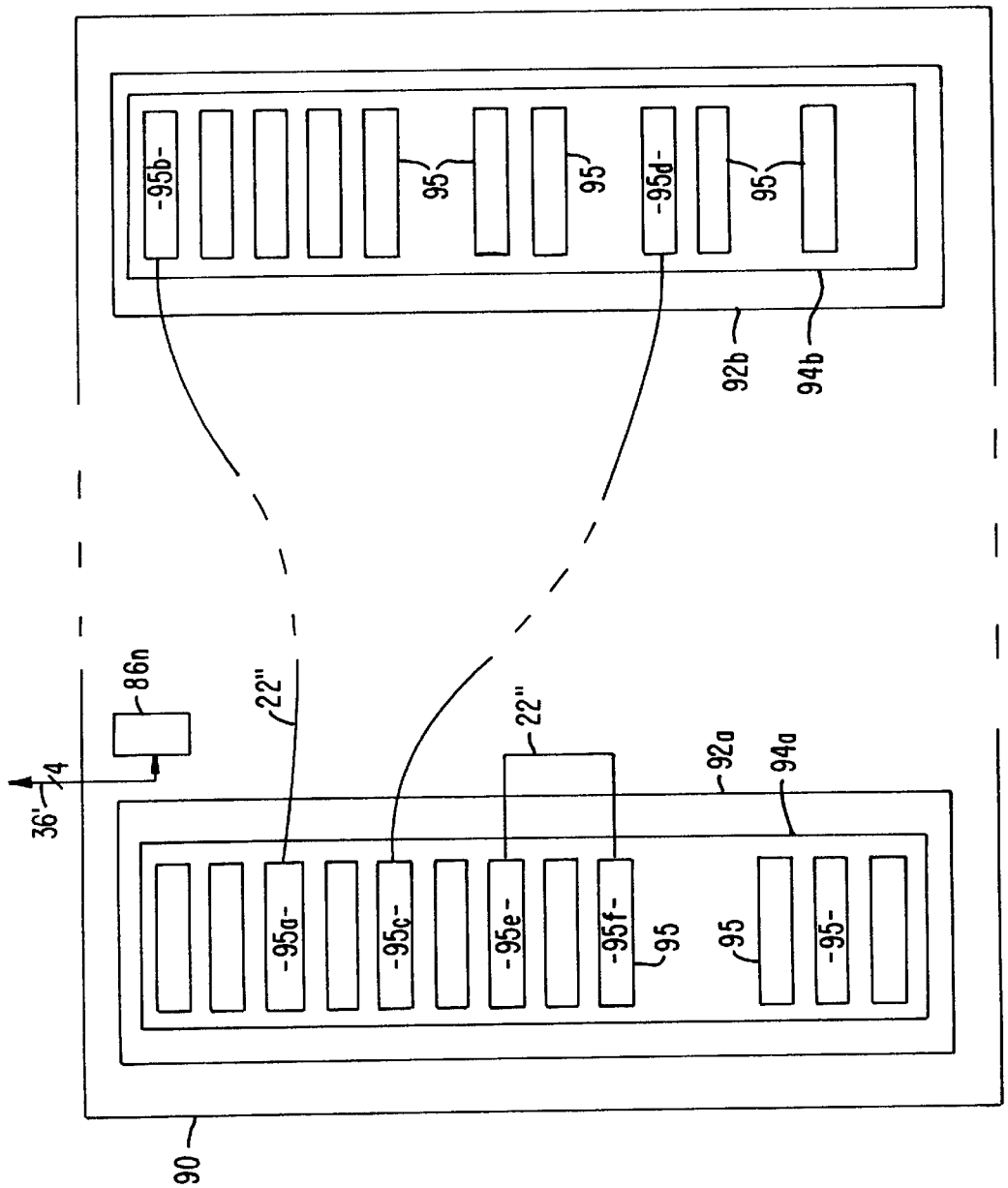
FIG. 7 illustrates as a system element an interconnect in the form of, for example, a backplane connection, structured to receive and inter-couple the groups of system elements illustrated in FIGS. 4, 5, and 6 to form the system of FIG. 1.

The processing system 10 is constructed to group certain of the system elements together. For example, system elements such as two or more of the routers 20, may be mounted on a circuit board, or in some other type of unit, that is removably connected to the remainder of the processing system 10 through a backplane structure. The backplane structure includes conventional receptive connector parts for receiving corresponding mating parts carried by the circuit board (not shown) or removable units (not shown). FIGS. 4, 5, and 6, are illustrative representations of assemblies carrying various of the system elements of processing system 10 (FIG. 1); FIG. 7 represents a backplane (or other) structure 90 having connector receptacles 92 adapted to removably receive the assemblies 80.

The assemblies 80 may take any form. Here, they are described as being printed wiring boards (PWBs) structured to carry and interconnect the system elements the particular assembly may carry, and to be removably received by (and connected to) the backplane structure 90 (FIG. 7). However, it will be evident to those skilled in this art that the assemblies 80 and/or the backplane structure 90 may take other forms. For example, the system 10 may be packaged as a cabinet structured to receive the assemblies 80 in the form of removable drawers that carry the components (system elements) of the system.

Referring now to FIG. 4, the assembly 80a is shown as being structured to carry the two routers 20a, 20b. As FIG. 4 also illustrates, certain of the network circuit paths (i.e., links 22 of SAN 16—see FIG. 1) connect the routers 20a, 20b to one another, while others are coupled to connector tabs 82a configured to be received by mating connector parts of the backplane assembly 90. (It will be understood that the assemblies 80 most likely will carry other components such as, perhaps, power supplying apparatus. Further, other circuit paths, in addition to those forming the links 22, may be present, some of which may also connect to connector tabs of the assembly. These, however, are not shown because, first, they are not necessarily pertinent to the understanding of the invention and, second, to avoid unduly complicating and thereby obscuring the Figures.)

The assembly 80a, as do the other assemblies 80 and the backplane structure 90, carries a storage element 84a in the form of a serial electrically erasable programmable read only memory (SEEPROM) 86a. The SEEPROM 86a is structured to receive a one of the 4-bit SMB sub-links 36' thereby providing the service processor 32 (FIG. 1) access to the SEEPROM 86a, via the top level Mrouter 34 and the Mrouter cloud 38. The SEEPROM 86a is structured to respond to SPI protocol, and contains information identifying the system elements carried by the assembly 80a, i.e., routers 20, and their network connections (network links 22), including those links 22 that run to the connector tabs 82a.

FIG. 5 illustrates an alternate construction of an assembly 80, here assembly 80b, showing it as carrying the three routers 20a, 20b, 20c, together with the I/O interface unit 16. As with the assembly 80a (FIG. 4), the assembly 80b includes connector tabs to which are coupled certain of the links 22 that run from certain of the ports of the routers 20. Unlike the assembly 80a, however, certain of the network links, shown here as network links 22', from the router devices 20a, 20c, are brought off the assembly 80b for external connection—such as connecting another processing system (e.g., processing system 10'—illustrated in FIG. 1 in phantom). Like the assembly 80a, the assembly 80b carries a SEEPROM 86b accessible by the service processor 32 via the sub-bus 36', containing a description of the system elements and network links 22 carried by the assembly 80b.

FIG. 6 illustrates an assembly 80c carrying the processor $12_a$. The processor $12_a$ (as does the processor $12_b$, although not specifically shown) includes a pair of network interfaces 13 for receiving from, and transmitting onto, those portions of links 22 carried by the assembly 80c. Links 22 connect to connector tabs 82c. Assembly 80c carries SEEPROM 86c, again containing information identifying the system element carried by the assembly 80c as the processor 12a, and the link connections between that processor and the tabs 82c.

The assemblies 80 are removably accepted and thereby interconnected by the backplane assembly 90 illustrated in FIG. 7. For that purpose (receipt of assemblies 80) backplane assembly 90 includes assembly slots 92, each containing connector parts 94 that are configured to receive the mating connector parts of the assemblies 80, including the network link connector tabs 82. The connector parts 94 are illustrated as including network connections 95 that would, when an assembly 80 is inserted in the socket 92 for receipt by the connector part 94, mate with a corresponding one of the tabs 82.

Before continuing, it should be made clear that the tabs 82 of the assemblies 80 (e.g., tabs 82a of assembly 80) may take a number of forms. For example, the tabs may form a part of a multi-pin connector in which case the tabs are actually implemented by 20 connector pins (remember, links 22 are each 20 signal lines). Similarly, the connector part 94 of the backplane assembly 90 would carry a number of female pin connectors, groups of which receive the pins represented by the tabs 82.

It should also be understood that the slots 92 are designed to accept only specific ones of the assemblies. For example, the slot 92a will receive assembly 80a, and for that purpose includes the connector part 94a configured with tab receiving parts 95 positioned to mate (both mechanically and electrically) with connector tabs 82a. Similarly, slot 92b, with connector part 94b, is configured to mateably receive assembly 80b. Not shown for reasons of clarity would be other, similarly constructed slots 92 for removably accepting other assemblies such as assembly 80c, or additional editions of assemblies 80a and/or 80b.

The backplane assembly includes the wiring (either in PWB or some other fashion) that forms the network link connections (links 22—FIG.) to connect the various system elements carried by the assemblies 80 received by the slots 92. Thus, for example, formed as a part of the backplane assembly 90 are links 22", to illustrate just a few, connecting connections 95a, 95c of slot 92a to connections 95b, 95d, respectively, of slot 92b. Thereby, predetermined ports (e.g., ports 1 and 5 of router 20a, assembly 80a, to ports 0 of each of routers 20b, 20c of assembly 80b) are communicated to one another.

The backplane (or interconnect) assembly 90 also carries a SEEPROM 86n coupled to the service processor 32 by one of the SMB sub-buses 36' (and Mrouter 34 and Mrouter cloud 38). The information content of the SEEPROM 86n will describe the backplane assembly 90 in terms of what types of slots 92 exist, what types they are (i.e., what type of a assembly 80 is to be received by any particular slot), and what network link portions 22" interconnect various of the connections 95.

Figure 8:
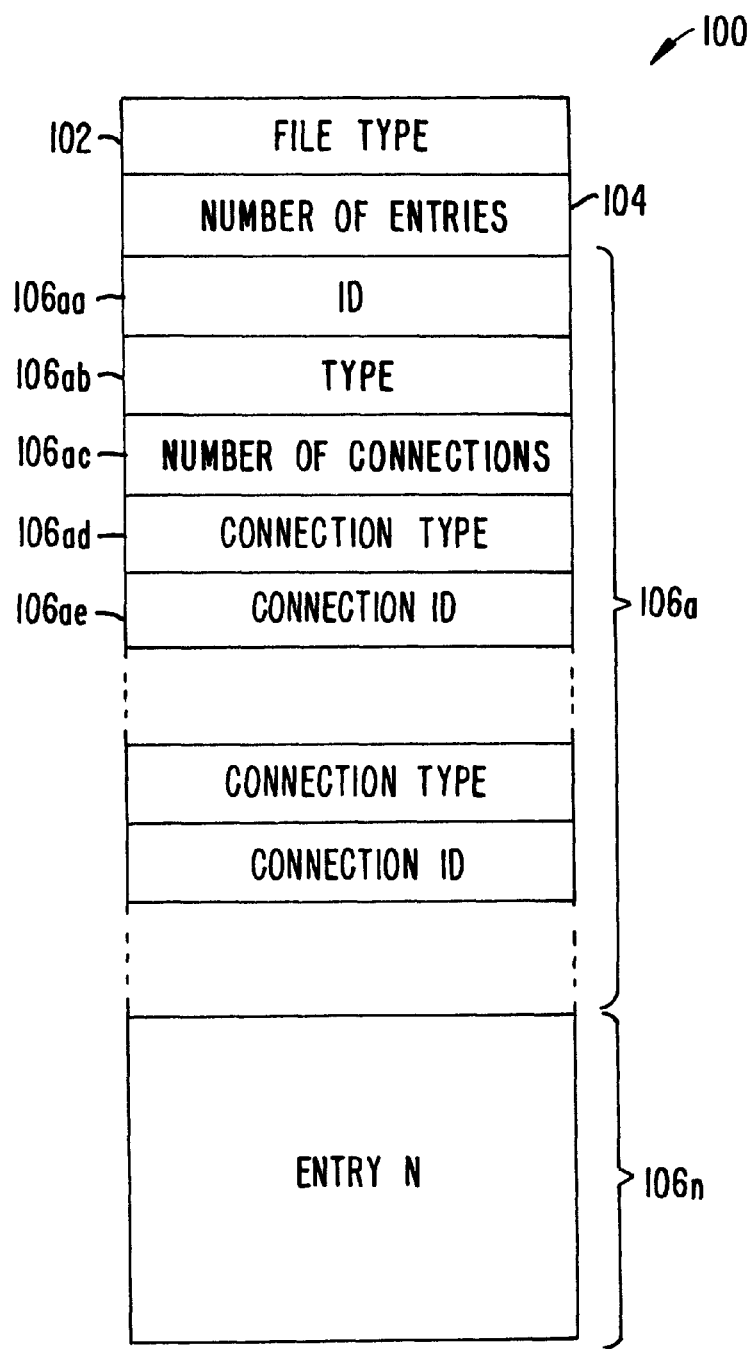
FIG. 8 illustrates the format of an information file contained in a storage member associated with a group of system elements as shown in FIGS. 4–7, and describing, among other things, the network connections of the associated system elements.

FIG. 8 illustrates a format used to store the descriptive information maintained by the SEEPROMs 86 for the assemblies 80, 90. As FIG. 8 shows, the information is in the form of a file 100 having a plurality of entries. A first (single-field) entry 102 identifies the particular type of assembly to which the file 100 pertains, i.e., whether it is information describing assembly 80a (FIG. 4), thereby conveying the fact that the assembly carried two router devices 20, or describing assembly 80b (FIG. 5), or whether it is a backplane assembly 90. The type field 102 is followed by another single-field entry 104 that identifies the number of multi-field entries 106 that are contained in the file 100. Each multi-field entry 106 will describe, in the case of the assemblies 80, (1) the system elements carried by the assembly, and (2) the network connections of each system element. Thus, for example, in the case of the network assembly 80a, the multi-field entry 106 corresponding to that assembly (e.g., multi-field entry 106a) has a first field (ID) 106aa that identifies the instance of the system element. For the assembly 80a, the instance or ID of router 20a may be one, while the entry for the router 20b would have an instance of two. (In essence, the value of the ID field 106aa can identify the particular entry 106.)

Continuing, the next field 106ab of entry 106a will identify the type of system element (e.g., router device). Field 106ac identifies the number of network connections of the system element to which the entry (106a) pertains. Here, since the multi-filed entry 106a corresponds to a router (20a), the number of network connections would be six.

The identification of the number of network connections of the device to which the multi-field entry 106a pertains (router 20a) is then followed, for each network connection, field pairs 106ad, 106ae. Here, since it is a router (20a) that is being described by the multi-field entry 106a, there will be six field pairs 106ad, 106ae, one for each of those network connections. The first field of the pair, 106ad, describes the type of connection. A network connection may be external, such as those of assembly 80b (FIG. 5) to which network link portions 22' connect; or, the network connection may be one that goes to a slot tab 82; or, it may be a network connection that does not leave the assembly such as the network connection 22 connecting port 2 of the router device 20a to port 1 of the router device 20b (FIG. 4). Field 106ad of each pair 106ad/106ae will, then, provide information as to whether the corresponding connection is an external connection, a slot tab connection, or identify that it is not a connector type but, rather, an on-board connection, identifying the specific element to which it connects by providing a value that is an index into the file 100 for the entry 106 that describes other on-board devices. For example, this field 106*ad* will describe the connection for port 2 of the router 20*a* (of assembly 80*a*—FIG. 4) with a value that can serve as an index into the multi-field entry 106*a* to the multi-field entry 106 that corresponds to router 20*b*.

Where the field 106*ad* indicates the connection type, the second field 106*ae* of the network connection pair describes the other end of that connection. Thus, if field 106*ad* identifies the correction as external, field 106*ae* identifies which external connector; if field 106*ad* identifies connection to a slot tab, field 106*ae* will identify which slot tab; and, finally, if field 106*ad* identifies the connection as neither external or a slot tab, but is an on-board connection (by providing a value that, as explained, is an index into the file 100 to the entry 106 describing the other element), field 106*ae* describes which port of the other element.

An example may be advantageous. Consider assembly 80*b* (FIG. 5) which carries four devices: three routers (20*a*, 20*b*, 20*c*) and an I/O interface 16. Field 104 of the SEEPROM file 100 (FIG. 8) for assembly 80*b* would identify four entries 106. Assume the first entry 106*a* pertains to the router 20*a*. The ID field 106*aa* would identify the router as one of the four possible instances (and, thereby, identifying the entry itself). The type field 106*ab* would specify the device as a router. Field 106*ac* identifies the number of network connections (six), thereby also identifying the number of field pairs 106*ad*, 106*ae*. Assume the first field pair pertains to port 0 of the router 20*a* which, as FIG. 5 shows, is an on-board connection to the I/O interface 16. Thus, the type field 106*ad* would specify the on-board connection with a value (the instance of the I/O interface) that can be used as an index into the file 100 to the multi-field entry 106 corresponding to the I/O interface. The second field 106*ae* of the pair identifies the port. (Here, there is only the single port of I/O interface 16, but if this field pair 106*ad*, 106*ae* were describing the connection of port 4 of router 206, field 106*ae* would identify port 1 of router 20*b*.)

Assume now, the next field pair 106*ad*, 106*ac* corresponds to the network connection for port 1 of router 20*a* (still considering assembly 80*b*—FIG. 5). The type field 106*ad* would have a value that indicates connection to a slot tab 82*b*, and field 106*ae* would identify which slot tab 82*b* within the connector containing all slot tabs 82*b*. In similar fashion, the field pairs 106*ad*, 106*ae* for port 2 of router 20*a* would describe the connection as external, and which one (of the three shown) of the external connections, respectively.

The entry 106*a* for router 20*a* (assembly 80*b*) would be followed by three more similar multi-field entries 106, one describing each of the remaining system elements—the router devices 20*b* and 20*c*, and I/O interface 16. Thus, the SEEPROM file 100 for assembly 80*b* would contain four multi-field entries 106. Assembly 80*a*, on the other hand, requires a file 100 with only two entries 106: one each for the router devices 20*a* and 20*b*.

The information contained in the file 100 for the backplane assembly 90 (FIG. 7) is essentially the same. (If there are more than two backplane assemblies 90, or other structures that removably receive assemblies 90 or their like, a file would exist for each also.) Thus, for the backplane assembly 90 the field 102 of the corresponding SEEPROM file 100 would identify the structure as being a backplane structure 90. The field 104 identifies the number of assembly slots 92 carried by the backplane assembly 90. For each assembly slot, there will be multi-field entry 106 describing:

a. The identification of the slot (field 106*aa*). For example, slots may be numbered, as viewed in FIG. 7, from left to right as 0, 1, . . . , n−1 (for n slots). Each slot, then, would take on a number according to its location in the numbering arrangement—similar to the instance of a device of an assembly 80. Slot 92*a*, therefore, would be identified as slot "0," while slot 92*b* would be identified as slot n−1 (there being n slots) with the remaining n−2 slots between them.

b. The "type" field 106*ab* identifies the particular type of assembly 80 the assembly slot 92 (to which the multi-field 106 pertains) is structured to receive. For example, if the assembly slot is structured to receive an assembly 80*a*, the field 106*ab* for that assembly slot would identify an assembly 80*a* as the type received by that slot. Alternatively, if the assembly slot receives an assembly 80*b*, field 106*ab* would identify an assembly 80*b*.

c. Field 106*ac* then identifies the number of network connections carried by the slot described by the entry. For example, in FIG. 7, the slot 92*a* is shown as containing 12 network connections, while the slot 92*b* contains ten network connections 95.

d. For each of the number of connections, there will be a pair of fields 106*ad*, 106*ae*. They identify the other end of the connection in terms of an indication or index to an entry 106 in the file 100 describing that other end (field 106*ad*), and the specific network connection 95. For example, the field pair 106*ad*, 106*ae* for the network connection 95*a* of slot 92*a* (FIG. 8) would provide a value (field 106*ad*) that identifies the entry 106 that describes the slot 92*b* (to which network connection 95*a* connects by link 22') and (in field 106*ae*) the location within slot 92*b* of the network connection 95*b*. In similar fashion the field pairs 106*ad*, 106*ae* for the connections 95*e* and 95*f* would point to each other by slot information identification (field 106*ad*) and location (field 106*ae*).

If the entry 106 corresponds to a description of the slot 92*a*, it will contain 12 connection type/ID pairs 106*ad*/106*ae*. For each slot carried by the backplane structure identified in field 102, there will be a slot description entry 106, in the form described above.

According to the present invention, the information contained in the SEEPROMs 86 is gathered by the service processor 32 and used to construct a topographical description of the system 10 (FIG. 1) in terms of the network connection links 22 used to convey information. With this information, the service processor 32 can determine the shortest route from any system element to any other system element, using standard graph traversal algorithms (e.g., a depth—first search, then a breadth first search) such as are described in "Algorithms in C," by Robert Sedgewick (1990), published by Addison-Wesley. (The depth first search is discussed at pages 423, et seq.; the breadth first search is discussed at pages 430 et seq.). Using this route information, the SP 32 can, through the OLAP 44 (FIG. 2), access each router device 20 to write the associated routing table 72 accordingly so that a message packet received at one port will be routed by routing logic 70 to a port that is on the path to the destination of the message packet.

The gathering of information from the various SEEPROMs 86 is conducted by the maintenance process system 30 (FIG. 1) and its connections to the system elements through the top level Mrouter 34, the maintenance routers that make up the Mrouter cloud 38, and the sub-bus connections 36'. The information gathering relies upon the ability of the Mrouters (both the top level Mrouter 34 and those that make up the Mrouter cloud 38) to selectively provide the SP 32 with access to each of the SEEPROMs 86. Configuration similarly relies on the Mrouters to selectively provide the SP 32 with access to various registers, latches and memory (e.g., routing tables 72 of routers 20) so the IDs can be given, and routing information provided. Thus, an understanding of the general architecture of the Mrouters will assist in understanding one way the invention can be implemented.

Figure 9:
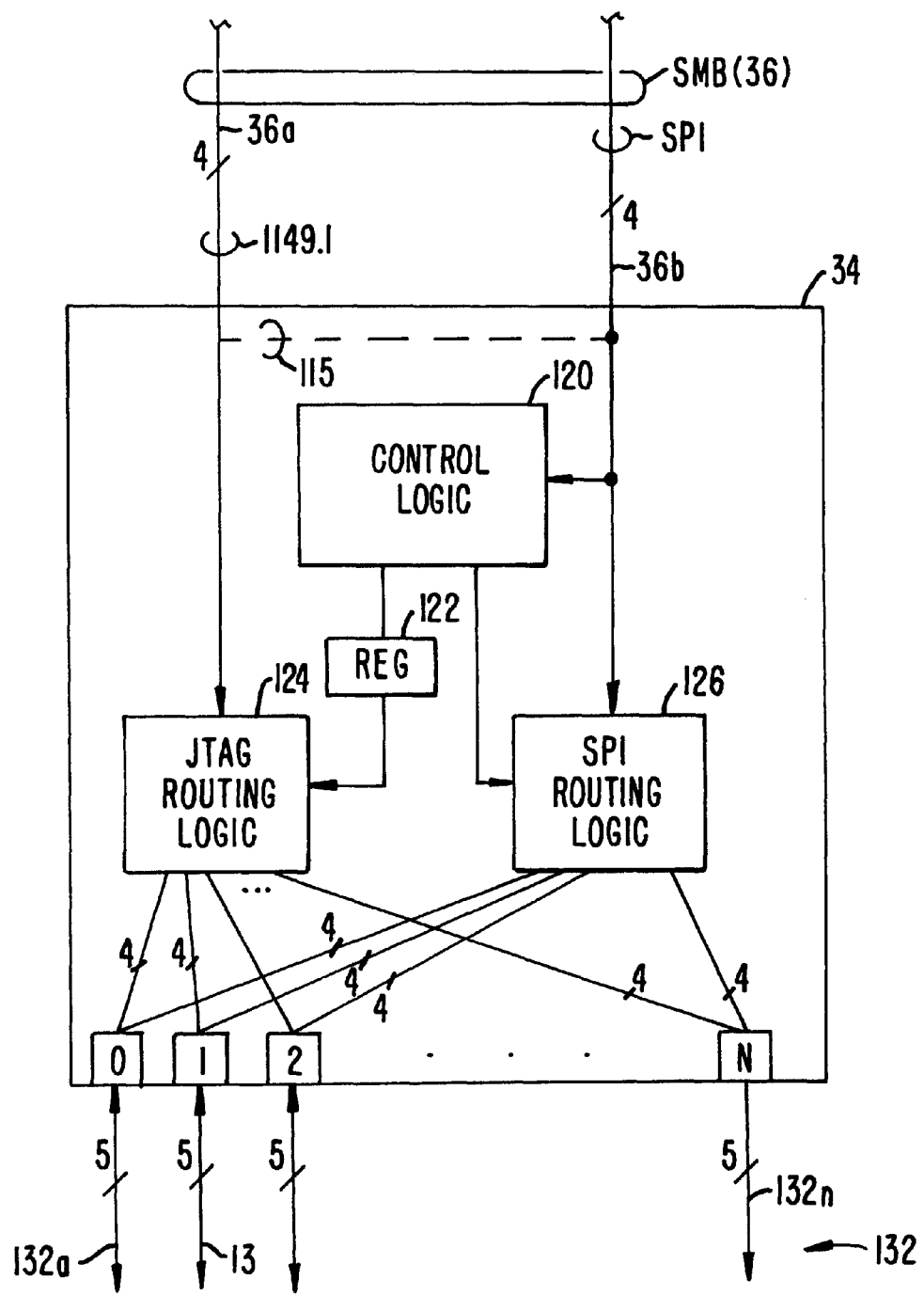
FIG. 9 illustrates broadly a maintenance router (Mrouter) device used to route a serial maintenance bus SMB between the system elements and a service processor to provide communication therebetween.

Turning then to FIG. 9, there is illustrated broadly the construction of the top level Mrouter 34. The Mrouters that form the Mrouter cloud 38 are substantially identical, with one major exception which will be explained, so that a description of the Mrouter 34 will apply equally to other Mrouters, except as explicitly described.

Turning then to FIG. 9, the top level Mrouter 34 is shown as receiving the two separate 4-bit sub-buses (36a, 36b) that make up the SMB 36. This is the exception in the construction between the top level router 34 and the Mrouters that form the Mrouter cloud 38: Mrouter 34 receives two separate 4-bit buses 36a, and 36b. The Mrouters of the Mrouter cloud 38, as FIG. 10 receive only a single 4-bit bus at the upstream side. However, the remaining construction of the Mrouter 34 is otherwise identical to that of the Mrouters of the Mrouter cloud.

The top level Mrouter 34 includes control logic 120 that is coupled to JTAG ("JTAG" is an acronym for the group responsible for promulgating the IEEE 1149.1 Standard: the Joint Test Action Group) routing logic 124 via a register 122. The control logic 120 is also connected to a SPI routing logic 126. In turn, the JTAG and SPI routing logic units 124, 126 are each separately coupled, by 4-bit paths, to ports 0, 1, . . . , N. Preferably, N is 8, although it will be recognized by those skilled in the art that any number can be used depending upon the desired design.

Control logic 120 operates in response to instructions that are conveyed on the 4-bit SPI bus 36b. Instructions on the SPI bus operate to set up the JTAG routing logic 124 to form, in essence, a conduit between the received bus 36a and one of the ports 0, 1, . . . , N. The control logic 120, in response to SPI instructions, will also select one of the ports for communicating one of the 4-bit inputs (also selected by the control logic 120) from either the JTAG routing logic 124 or the SPI routing logic 126. Thus, the 4-bit output lines 132 from the Mrouter 34 will carry either SPI signals or IEEE 1149.1 Standard signals.

The four signals carried by the sub-buses 36a, 36b are conventional IEEE 1149.1 Standard signals (sub-bus 36a) and SPI signals (sub-bus 36b). The Mrouters are capable of two separate modes of operation: one for communicating signals provided by the SP 32 on the sub-bus 36a, i.e., 1149.1 signals for scan operations; and the other for communicating SPI signals. Selection between which mode is used depends upon the digital state of one of the four SPI signals: SPISEL. When SPISEL is asserted, the Mrouter 34 will be placed in the SPI mode to communicate the sub-bus 36b to one of the output lines 132. (In the case of the Mrouters in the Mrouter cloud 38, the asserted SPISEL signal operates to enable the control logic 120 for SPI instructions.)

Figure 10:
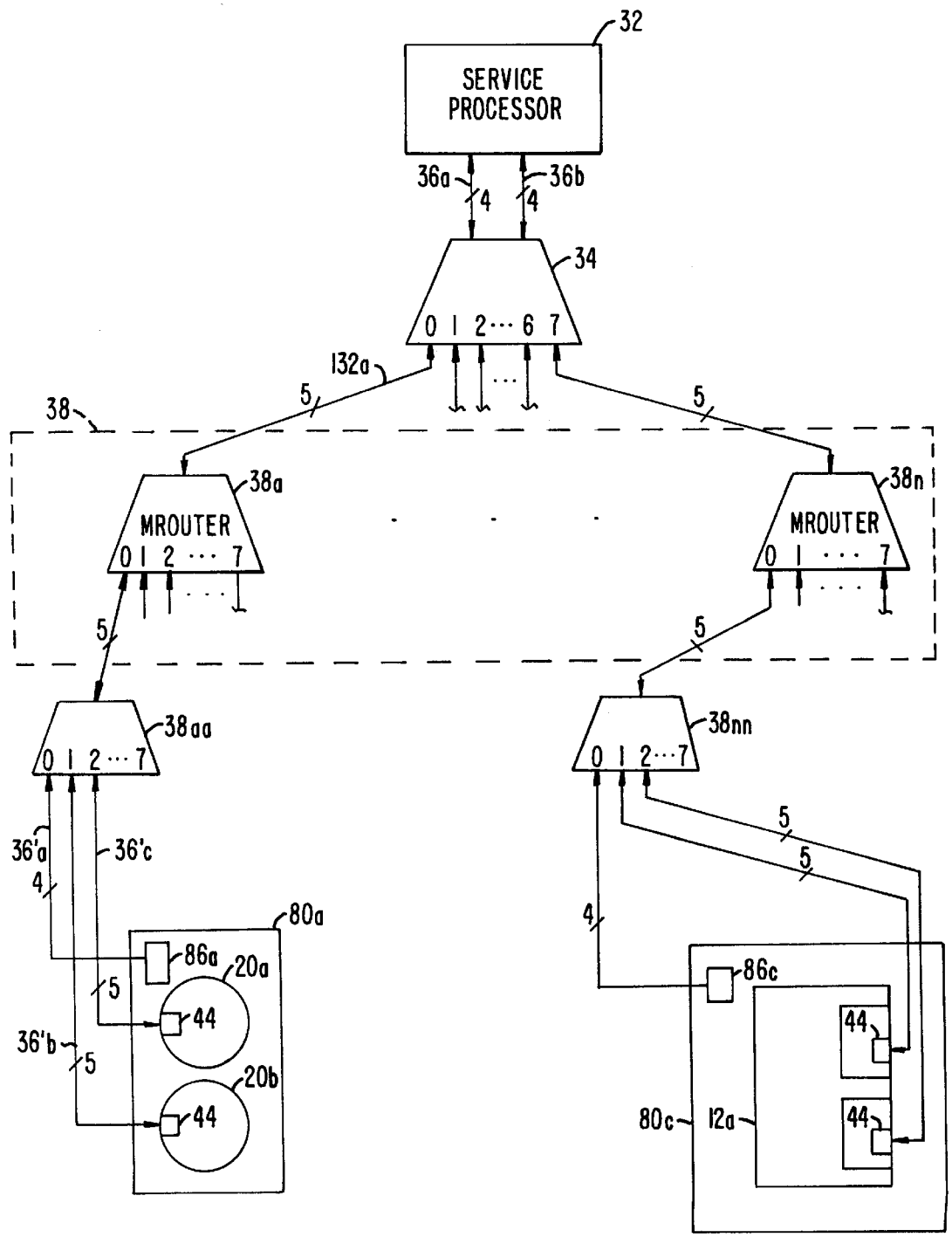
FIG. 10 is a partial block diagram of the service processor system of FIG. 1, illustrating use of a collection of Mrouters to distribute the SMB to the system elements and to the various storage elements for access thereto by the service processor of FIG. 1.

Referring to FIG. 10, operation of the top level Mrouter 34, and those of the Mrouter cloud 38 will be described. FIG. 10 shows the Mrouter cloud 38 as comprising a plurality of Mrouters 38a, . . . , 38n. Other M-routers (not shown) may also connect to the Mrouters 38a, . . . , 38n. FIG. 10 shows the Mrouter 38a as having three 4-bit SMB sub-buses respectively connected to the SEEPROM 86a, and the OLAPs 44 of the two router devices 20 carried by the assembly 80a. The SMB sub-bus 36'a connects to the SEEPROM 86a while the two other SMB sub-buses 36'b, 36'c respectively connect to the OLAP 44 (FIG. 2) of each of the router devices 20b, 20a. Other system elements are connected via the Mrouter cloud 38 in a similar fashion, including the backplane assembly 90 (FIG. 7), for access to the associated SEEPROM 86n.

Assume first that the SP 32 wishes to read the SEEPROM information of the assembly 80a. The SP 32 would initiate a "SPI session" by asserting the SPISEL signal carried by one of the four signal lines forming the SPI bus 36b, and then serially communicating instructions on the SPI bus 36b to the control logic 120 of the top level Mrouter 34. The instructions will effect selection of the port 0 of top level Mrouter 34 for communicating SPI signals to the downstream bus (to also select port 0 of the next downstream Mrouter—here, in FIG. 10, Mrouter 38a in the same manner as was done in the top level Mrouter 34). This will establish a SPI communication link between the SP 32 and the Mrouter 38a, via the SPI routing logic 126 (FIG. 9) of the top level Mrouter 34.

In the same manner as was done for the Mrouter 34, the control logic 120 of the Mrouter 38a can be programmed to select the 0 port of that Mrouter for SPI communication access to the downstream Mrouter 38aa. Again, the service processor provides an instruction that is serially conveyed through Mrouters 34 and 38a to the control logic 120 of the Mrouter 38aa to open the 0 port to the SEEPROM 86a (via sub-bus 36'a). The service processor 32, now having access to the SEEPROM 86a, and using standard SPI protocol, can read the information content of that SEEPROM to obtain a description of the system elements carried by the assembly 80a and their network connections.

In similar fashion, the service processor will access the SEEPROMs 86 of the other assemblies of the system 10, as well as the SEEPROM 86n.

The information gathered by the service processor 32 from the various SEEPROMs 86 is then used with standard graph traversal algorithms by first conducting a depth-first search of the gathered information to determine connectivity of system elements. This is followed by a breadth-first search to determine the shortest route between any one system element of the system 10 and any other system element of that system. The algorithm can also be used to determine the existence of path loops in the topology, and set path enable bits to break any loops that are found. Once the searching is complete, the SP 32 then uses the Mrouter cloud 38 to access the on-line access ports (OLAPs) 44 of the various system elements to write, for example, the routing tables 72, in the case of router elements 20, to implement routing paths according to the determinations made by the service processor 32. Similarly, those elements capable of transmitting and/or receiving information, such as processors 12 or the I/O interface 16 (FIG. 1), which also include OLAPs 44 that are written to provide identifications to be used as source IDs or destination IDs for the message packets.

Figure 11:
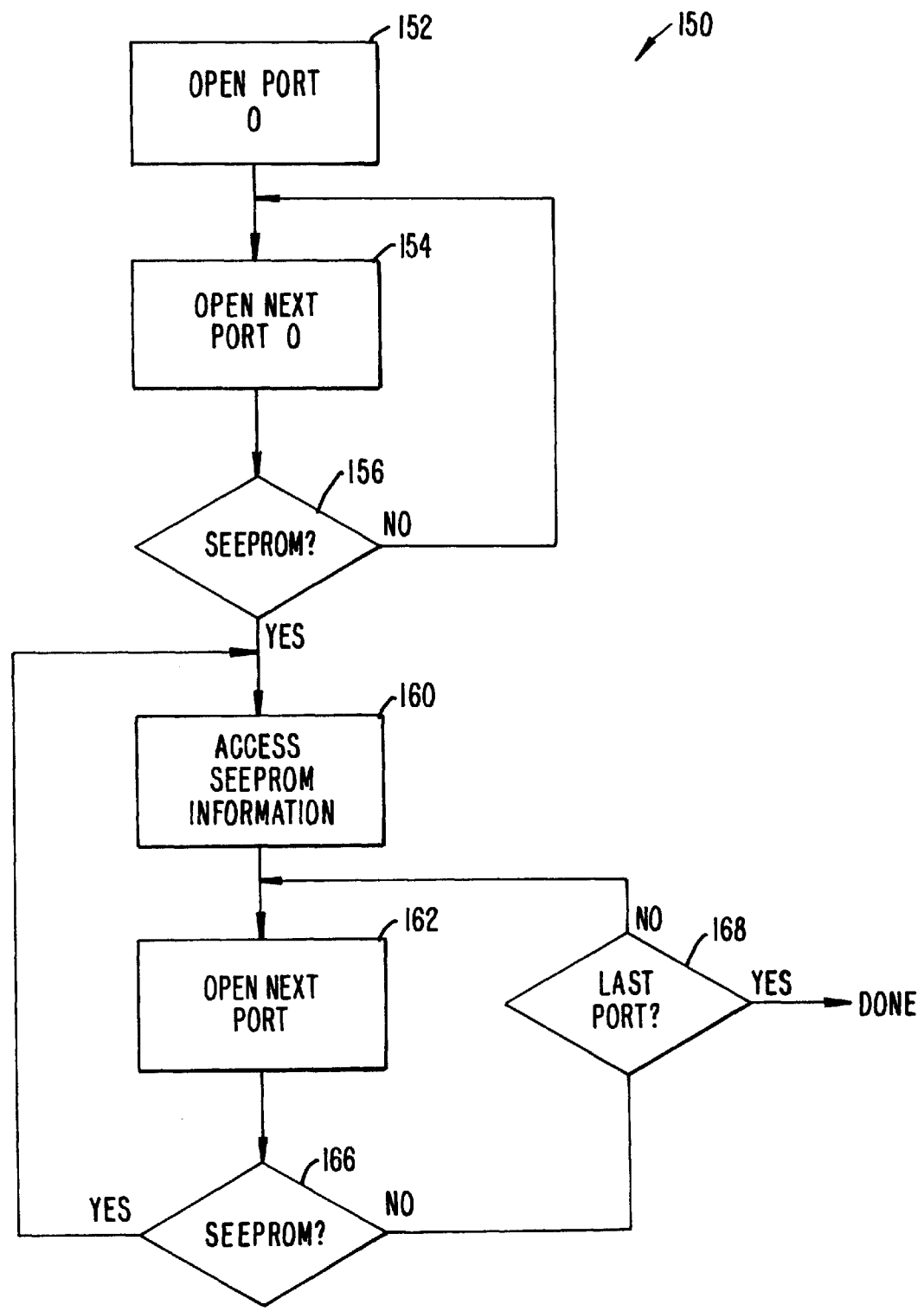
FIG. 11 is a flow diagram broadly illustrating operation of the service processor's employment of the Mrouters of FIGS. 1 and 10 to gather information from the various storage elements that is used to determine the topographical interconnections of the system area network of FIG. 1.

The approach described above for accessing the SEEPROM 86a implied a prior knowledge on behalf of the SP 32; in fact, there is no such knowledge at the outset. Rather, the SP 32 must seek out the SEEPROMs to read them. This information seek and gather operation, as performed by the SP 32, is outlined by the flow diagram 150 illustrated in FIG. 11. A basic rule for the search procedure is that a SEEPROM 86 will always be located at a port 0 of an Mrouter somewhere in the Mrouter cloud 38. The search for SEEPROM information begins at step 152 with the service processor 32 shifting into the upper level Mrouter 34 instructions to open port 0 for access to the next downstream Mrouter 38a (FIG. 10). The service processor 32 then sends serial instructions to the Mrouter 38a to open its port 0, step 154, and at step 156 tests to see if a SEEPROM 86 is located at that port. The test is conducted by sending data to the target device. Mrouters are constructed so that their upstream ports are initially configured in a loop back condition: data sent is returned to transmitting the Mrouter. If, however, a port is connected to a SEEPROM, no information will be mirrored back. Accordingly, the step 156 will involve the service processor 32 sending information out port 0 of Mrouter 38a to the next downstream level Mrouter 38aa—which will be returned. Accordingly, recognizing at step 156 that a SEEPROM is not attached to port 0 of Mrouter 38a, the procedure will return to step 154 to open port 0 of the next level Mrouter, Mrouter 38aa.

Again, at step 156, the service processor 32 will communicate data through the Mrouters 34, 38a, and 38aa, out port 0 of Mrouter 38aa. This time no data is returned. Thus, recognizing that a SEEPROM has been reached, the service processor 32 will, at step 160, access the SEEPROM information.

The information provided by the SEEPROM 86a, as indicated above, describes the assembly 80a, including the elements it carries (router devices 20a, 20b), the communicative connections used by the router devices. If the assembly 80a carries any additional SEEPROMS, the information from the SEEPROM 86a will provide that information as well. The communicative connection information will allow the SP 32 to access such other SEEPROM by, at step 162, opening the port of the Mrouter (or Mrouters if the SEEPROM is more than one Mrouter away).

Preferably, the SP 32, the top level Mrouter 34, and perhaps some of the Mrouters 38 contained in the Mrouter cloud are carried by one of the assemblies 80, such as the assembly 80a. Thus, the SP 32, the top level Mrouter 34, and the downstream Mrouters 38a, 38aa would be carried by the assembly 80a with the routing devices 20a, 20b and, of course, the SEEPROM 86a. Once the SEEPROM 86c is located, using steps 152–160 of the process 150 (FIG. 11), the SP will have information describing the router devices 20 and their communicative interconnections, but also information as to the Mrouters (top level Mrouter 34 and Mrouters of the Mrouter cloud 38) carried by the assembly and their communicative interconnections.

Some Mrouter connections will be to slot tabs 82 to provide a path (via the backplane assembly 90) to other Mrouters located on other assemblies. For example, port 7 of the top level Mrouter 34 may go to a slot tab 82 to communicatively connect to Mrouter 38 which may be carried on assembly 80c (together with Mrouter 38nn, processor 12a, and SEEPROM 86c. Accordingly, the SP 32 will begin investigating those ports of the Mrouters carried by assembly 80a that are connected to a slot tab 82 (or connected to an Mrouter that has a port or ports connected to slot tabs 82) to see if an Mrouter is located at the other end of whatever the slot tab communicatively connects to. If an Mrouter is located, the SP 32 knows to initiate a 0 port search, as described above, to locate the SEEPROM carried by the assembly 80. This is illustrated in FIG. 10 for the SEEPROM 86c and assembly 80c which, for purposes of this discussion, also carries the Mrouters 38n and 38nn.

In similar fashion, the SP 32 will investigate the other ports of the Mrouters carried by assembly 80a that connect to a slot tab 82 of the assembly 82a to see if an Mrouter (and a SEEPROM) exists at the other end of the path. The same procedure is taken for the assembly 80c, and all other assemblies of the system 10, as they are found, and their associated SEEPROMs accessed for the information they contain.

When the search is complete, the service processor 32 will have found all SEEPROMS then in the system, gathered the interconnect information, and assembled the necessary graph for routing configuration. In substantially the same fashion, the service processor 32 will then access the various OLAPs 44 by first opening ports through a SPI session, and then relinquishing control to a JTAG operation. The access to the OLAPs allows the service processor 32 to, for example, program the routing table logic 72 of any routing device such as routing devices 20a, 20b (FIGS. 1 and 10), as well as routing device 20c (FIG. 1). In addition, as indicated above, the service processor will access OLAPs of, for example, processors 12 and the I/O interface 16 to provide them with identification values that may be used as destination IDs or source IDs.

The service processor system 30 is also used to configure growth of the system 10 by addition of another system. Returning to FIG. 1, illustrated in phantom is a second system, designated with the reference numeral 10', which most likely will include a processor or processors and peripheral devices (accessed through an I/O interface—not shown), including a router device 20' and a maintenance processing system 30' that includes a service processor 32', a top level router 34', and an Mrouter cloud. In the same fashion as described above with respect to system 10, the system 10', through the aegis of the maintenance processing system 30', determine the topographical configuration of the various network interconnections (links 22') between the elements, and perform the necessary configuring operations such as programming the router device 20 (and any other router devices in the system 10') and assign identification values.

Adding the system 10' to the system 10, and getting the two systems to recognize each other, will require the service processors 32, 32' to re-configure their respective systems 10, 10' so that message packets sent from a system element from one system (e.g., processor 12a of system 10) to a system element of the other system (e.g., processor 12b' of system 10') will be routed by the most expeditious route. This aspect of the invention relies, in part, upon a feature of the protocol used to communicate information on the SAN 18: a "keep-alive" mechanism. Briefly, the keep-alive mechanism involves the periodic transmission of a symbol in absence of data transmission. The mechanism is implemented at each interface to a network link 22 such that either a BUSY symbol or a READY symbol is transmitted on the link every T seconds (where T is approximately 20 microseconds). Of course, the mechanism is implemented when a data transmission is being conducted by an interface to a network link 22. However, during periods of no data transmission, if longer than T seconds, the interface will transmit a symbol.

Figure 12A:
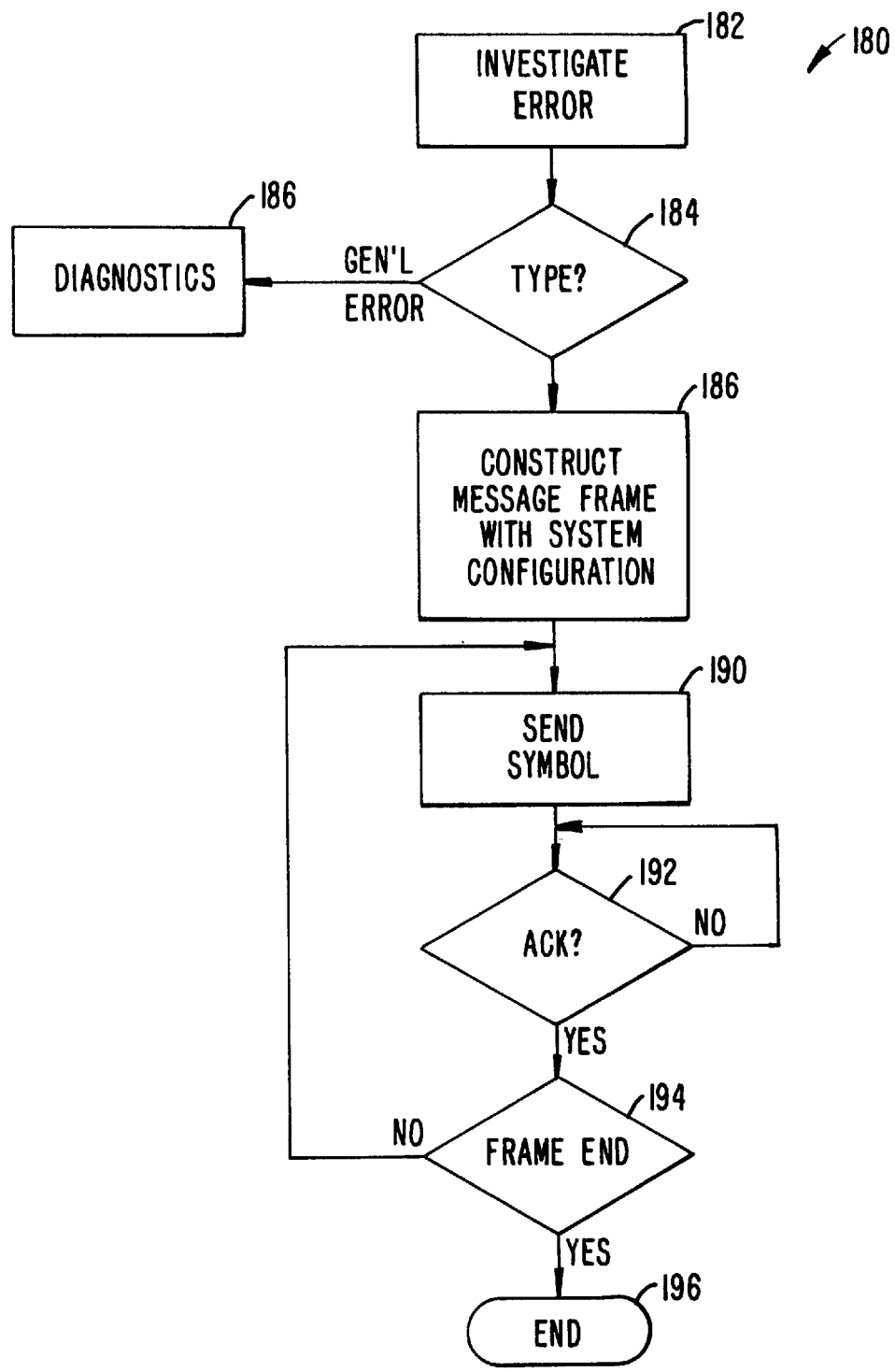
FIGS. 12A and 12B are a flow diagrams that broadly illustrate the operations taken by the maintenance systems of two separate computing systems when one detects connection of a the other (illustrated in phantom in FIG. 1) and subsequent use of a Link Probe message packet to initiate an exchange of configuration information between the two systems.

Referring now to FIGS. 1 and 12A, assume that the system 10 has gone through the configuration procedure described above, i.e., the maintenance processing system 30 has gathered from the various SEEPROMs 86 the interconnect information needed in order to allow it to write the appropriate information to the routing tables 72 of the router devices 20, and to assign network identifications (IDs) to the system elements 12 and 16. Assume further that the same procedure was taken by the other processing system 10'. Now assume that the two systems are interconnected by the network link 220, coupling the port 0 of the router device 20' (of system 10') to port 3 of the router device 20b (of the system 10). Of course, when the systems 10 and 10' were configured, the router devices 20b and 20' are aware that, before the network link 220 is installed, port 3 of router device 20b (and port 0 of router device 20') are unconnected, and should not be receiving information of any kind thereat. However, when the network connection 220 is installed, the router device 20' will be transmitting the "keep-alive" symbol: READY. The router device 20b will commence receiving these periodic READY symbols, causing the receiving router device to set an interrupt status bit that indicates that the router is now receiving at this port. That status bit is communicated, via the interrupt line (the fifth of the five signal lines that form a part of the SMB bus structure 39), through the Mrouter cloud 38 and top level Mrouter 34 to the service processor 32.

Digressing for the moment, a router device, or any other system element, may generate a number of interrupts for different reasons. Although different interrupts are generated, they are combined (by a logical ORing) to one interrupt signal that is conveyed to the SP 32 by the fifth signal line of the 5-bit SMB. The interrupt signal notifies the SP 32 that a system element has requested some form of attention; to determine who issued the interrupt, the SP 32 will trace the interrupt back to the SMB "tree" to find the Mrouter asserting an interrupt signal (or Mrouters; there could be more than one).

Here, if SP 32 finds that the source of the interrupt is in a router device that has its interrupt status bit to indicate receipt of READY symbols at a previously silent port, the SP 32 of the system 10 will enter an error handling procedure, a part of which is illustrated in FIG. 12A by the flow diagram 180. The initial step, step 182, has the service processor 82 investigating the error. The service processor must do a search through the Mrouter cloud 38 to determine which Mrouter device has its interrupt register set. It will ultimately locate the router device 20b, and will, using a scan procedure (as described by the IEEE 1149.1 Standard), extract information contained in registers of the OLAP 44 of the router device 20b describing the cause of the interrupt. The service processor 32 will, at step 184, determine from the information received the type of error. If it is of a type that requires general diagnostic procedures, the service processor will move to step 186 to initiate general diagnostic routines. If, on the other hand, as here, it is a communication received at a previously known unconnected port, the service processor will move to step 186 where it will, symbol-by-symbol, through the OLAP 44 of the router device 20b' cause a message packet to be transmitted from the port 3, onto the connecting link 220, to port 0 of router device 20'.

Digressing for a moment, it was explained above that message packets are formed from a number of 9-bit symbols which are encoded in a 8B/9B format. Three bits of each symbol identify whether or not the symbol is data or a link level command. Certain bit configurations for symbols, however, are not allowed according to the standard protocol for data transmissions in the network 18. These "illegal" symbols are used as a "link probe" by a service processor in the circumstances here discussed, to communicate with the service processor of a newly connected system.

Table I, below illustrates the symbol encoding used. The three most significant three bits (CD8, CD7, CD6) of each nine-bit symbol identify the symbol as containing command information (e.g., "READY") or data. If the symbol is data, the most significant three bits form two bits of data that is combined with the remaining six bits of the symbol to form a byte of data.

TABLE I

| 8B–9B Symbol Encoding | | | |
|---|---|---|---|
| CD8 | CD7 | CD6 | Function |
| 0 | 0 | 0 | Command |
| 0 | 0 | 1 | Error (Frame Start) |
| 0 | 1 | 0 | Error (Frame End) |
| 1 | 0 | 0 | Error (Link Probe Data) |
| 0 | 1 | 1 | Data <7:6> = 00 |
| 1 | 0 | 1 | Data <7:6> = 01 |
| 1 | 1 | 0 | Data <7:6> = 10 |
| 1 | 1 | 1 | Data <7:6> = 11 |
| * | * | * | <5> = 1; <4:0> = *; ACK |

Every system element capable of receiving SAN 16 transmissions (e.g., processors 12, routers 20, etc.) will check each symbol. If an invalid symbol is found (e.g., bits CD8–CD6 assume one of the values 001, 010, 100), the system element will copy the symbol to a register in its OLAP 44, and set an error status to attract the attention of the Sp 32.

As Table I shows, the illegal or error symbols identify one of three possible symbol functions for the Link Probe mechanism: a "Frame Start" (<8:6>=001), indicating, when interpreted by a service processor, that a Link Probe frame is beginning; a "Frame End" (<8:6>=010), indicating the end of a Link Probe frame, and, data (<8:6>=100), indicating that the remaining six bits contain data.

While a Link Probe transmission consists one or more frames, each comprising a number of symbols preceded by a Frame Start (error) symbol and concluding with a Frame End (error) symbol. An acknowledgement of each symbol sent, indicating receipt of the symbol by the destination service processor, must be received by the sending service processor before the next sequential signal is sent. This allows the receiving service processor to clear the OLAP 44 register containing the symbol, preventing overwriting by subsequently received Link Probe symbols. For this purpose a symbol with the fourth most significant bit set to a "1" (<5>=1) is used.

Returning to FIG. 1, therefore, the service processor will begin the necessary operations cause the router device 20b to transmit, from its port 3, illegal symbols (symbol by symbol, each producing an ACK symbol from the receiving SP 32') that, although illegal, provide the information indicated above. The router device 20', upon receiving the symbols via the network connection link 220, will identify them as illegal symbols, and set its interrupt latch to signal the service processor 32' of system 10'. It will also store each received symbol for retrieval and examination by the service processor 32'.

The service processor 32 of system 10, therefore, at step 186 will construct a message frame consisting of illegal symbols containing the configuration information of the system 10, i.e., IDs of the system elements (e.g., processors 12, I/O interface unit 16). It will also provide its own network ID. At the same time, it will re-write the routing table 72 of the router device 20b so that message packets received at port 3 of the router device 12b with the ID of the service processor 32, will find their way to the service processor, via the I/O interface 16. The service processor 32 will then await a response at step 192.

The SP 32 then, at steps 190–194, sends the message frame, symbol by symbol, to the SP 32' system 10', waiting for an ACK from the system 10' before the next successive symbol is sent. Finally, when the Frame End symbol is sent, and the ACK for that symbol received, the transfer of the message frame is complete, and the procedure is exited at step 196. The system 10' now has the configuration information of system 10, and can use this information to write the routing tables of its router devices 20' accordingly.

Figure 12B:
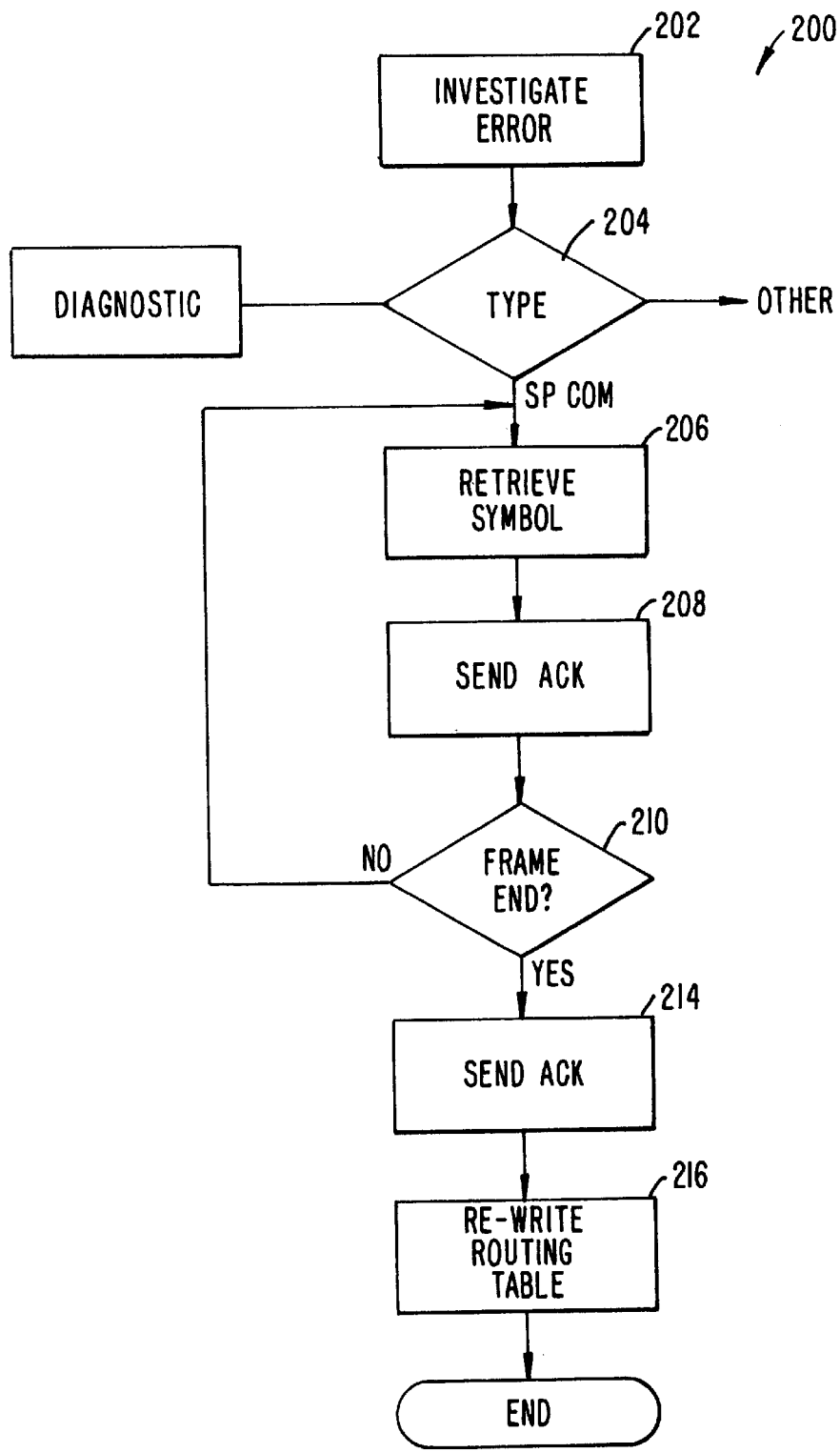

Meantime, as each of the symbols is received by the router 20' of system 10' it will see that the symbol is illegal (not a proper commend or data symbol), and set a corresponding status bit, and store the symbol in a register of its OLAP 44. The state of the status bit produces an interrupt that attracts the attention of the service processor 32' of system 10', causing it to ultimately enter the interrupt investigation illustrated by the flow chart 200 of FIG. 12B. Initially, at step 202, the service processor 220 will search to locate which device has its interrupt or status bit set, ultimately locating the router device 20'. At step 204, it will obtain sufficient information for it to determine the type of error and, finding it to be a service processor communication, will, at step 206–210 retrieve each symbol the incoming message frame by accessing the relevant registers of the OLAP 44 of router device 20.

Finally, at step 210, the last symbol of the message frame sent by the SP 32 of system 10 is received and recognized. Its receipt will be ACKed (step 214).

The service processor 32' will now have configuration information for the system 10, including the IDs for the various transmitting/receiving system elements of that system. The service processor 32' will re-write, as necessary, the routing tables of those router device of system 10' in order to ensure that message packets transmitted by the system elements of system 10' will be expeditiously be routed to the network interconnect 222 (or interconnects, if more than one is used). At the same time, the routing tables 72 of the router devices of system 10' will be re-written to route message packets from system 10.

Configuration information for the newly added system 10' is passed to system 10 in the same manner. The SP 32' will perform those steps 186–196 of the procedure 180 (FIG. 12A) in the same manner as described above to send the configuration information of system 10' to the system 10 in a message frame consisting of the illegal symbols shown in Table I, above. Similarly, the SP 32 of system 10 now performs the steps 202–214 of procedure 200 (FIG. 12B) to receive that message frame, and to re-write the routers 20 step 216) of that system accordingly to take into account the possible destinations of normal message packets in the newly-added system 10'.

What is claimed is:

1. A processing system, including:
   a plurality of processing elements;
   at least first and second electronic units carrying first ones and second ones, respectively, of the plurality of processing elements, each of the first and second electronic units having a first connector, circuit paths interconnecting the first and second ones of the plurality of processing elements and the first connector of the first and second electronic units, respectively, and a first storage element containing information describing the processing elements carried by such electronic unit and the circuit paths between the processing elements to the connector;
   a connection element having connector parts to receive the first connector of the first and the second electronic units, the connection element including network paths for communicating data between the first and second electronic units, the connection element having a second storage element containing information describing the network communication paths;
   configuration means coupled to the first and second elements for accessing the information to identify each the plurality of processing elements, the network connections of each to the first connector means, and the connections between them.

2. First and second processing systems each comprising a number of system elements interconnected by a network comprising network links and routing elements for communicating data packets therebetween, the first and second processing systems initially being unconnected to one another, there being at least a first of the router elements of the first processing system having a transmitting/receiving port not connected to a network link, a method of detecting connection of the first and second processing systems that include the steps of:
   providing the first and second processing systems each with a service processor system coupled to each of the system elements and each of the routing elements of such processing system by a maintenance bus for communication therewith;
   connecting a subsequent network link between the unconnected transmitting/receiving port and the second processing system;
   the service processor system of the first processing system detecting at the first of the router elements receipt of data transmission from the second system to use the maintenance bus to send, through the first of the routing elements and the subsequent network link, to the second processor system a link probe data packet containing a network identification of the service processor of the first processing system;
   the second processing system delivering the link probe data packet to the associated service processor system; and
   the service processor systems of each of the first and second processing systems using the network to exchange system information describing configuration of the first and second processing systems.

3. A processing system including:
   a number of modules, each of the number of modules having,
   (1) one or more processing elements
   (2) at least one connector,
   (3) first circuit paths interconnecting the processing elements and the connector,
   (4) a first storage element containing element configuration data identifying the processing elements and the first circuit paths as coupled to the connector of such module;
   a connection unit for receiving the connector of the number of modules, the connection unit having second circuit paths for electrically communicating the first circuit paths, through the corresponding connector, of the number of modules to one another in a predetermined manner and a second storage element containing connection configuration data identifying the connection unit and the second circuit paths; and
   a service processor coupled to the first and second storage elements to retrieve the configuration data from the first and second storage elements to determine routing paths between the processing elements.

4. The processing system of claim 3, wherein the modules are printed circuit boards.

5. The processing system of claim 4, wherein the connection unit is a backplane structure having connector part for receiving the printed circuit boards.

6. The processing system of claim 3, wherein the processing elements include at least one routing device having a writable routing table; the service processor being coupled to the routing table to provide routing information derived from the configuration for the routing device.

7. The processing system of claim 6, wherein other of the processing elements are first and second processor units interconnected by ones of the first and second circuit paths and the routing device for communicating data to one another.

* * * * *